(12) United States Patent
Kim et al.

(10) Patent No.: US 8,601,560 B2
(45) Date of Patent: Dec. 3, 2013

(54) METHOD FOR USER TERMINAL AUTHENTICATION OF INTERFACE SERVER AND INTERFACE SERVER AND USER TERMINAL THEREOF

(75) Inventors: Soo-Jin Kim, Seoul (KR); Duc-Key Lee, Seoul (KR); Jung-Hee Bang, Seoul (KR)

(73) Assignee: KT Corporation, Seongnam (KR)

( * ) Notice: Subject to any disclaimer, the term of this patent is extended or adjusted under 35 U.S.C. 154(b) by 109 days.

(21) Appl. No.: 13/203,664

(22) PCT Filed: Nov. 30, 2009

(86) PCT No.: PCT/KR2009/007086
§ 371 (c)(1),
(2), (4) Date: Aug. 26, 2011

(87) PCT Pub. No.: WO2010/098534
PCT Pub. Date: Sep. 2, 2010

(65) Prior Publication Data
US 2011/0314531 A1    Dec. 22, 2011

(30) Foreign Application Priority Data

Feb. 27, 2009  (KR) .................. 10-2009-0017026
Mar. 25, 2009  (KR) .................. 10-2009-0025464
Jun. 29, 2009  (KR) .................. 10-2009-0058167

(51) Int. Cl.
*H04L 29/06* (2006.01)

(52) U.S. Cl.
USPC ............... 726/7; 726/1; 726/2; 726/3; 726/4; 726/5; 726/6; 726/8; 726/9; 726/10; 726/12; 726/26; 726/27; 726/28; 726/29; 726/30; 713/168; 713/169; 713/170; 713/171; 713/172; 713/173; 713/175; 713/176; 713/177; 713/182; 713/183; 713/184; 713/185; 713/186; 709/217; 709/219; 709/223; 709/224; 709/225; 709/226; 709/229

(58) Field of Classification Search
USPC .................. 726/1–12, 26–30; 713/168–186; 709/217–229
See application file for complete search history.

(56) References Cited

U.S. PATENT DOCUMENTS 7,444,368 B1 * 10/2008 Wong et al. .................. 709/200
2001/0037451 A1 * 11/2001 Bhagavatula et al. ........ 713/155
(Continued)

FOREIGN PATENT DOCUMENTS

CA    2550506 A1    5/2006
EP    1178693 A1    2/2002
(Continued)

OTHER PUBLICATIONS

Secure Authentication System for Public WLAN Roaming by Matsunaga et al; Publisher: ACM; Year: 2003.*

*Primary Examiner* — Madhuri Herzog
(74) *Attorney, Agent, or Firm* — Sughrue Mion, PLLC

(57) ABSTRACT

Provided are a method for authenticating a user terminal in an interface server, and an interface server and a user terminal using the same. The method includes receiving authentication request information from an application service providing server in order to request the interface server to authenticate the user terminal receiving an application service provided from the application service providing server, authenticating the user terminal according to the authenticating request information using an authentication method selected by the interface server or a user of the user terminal, and transmitting authentication response information including an authentication result of performing the authentication method to the application service providing server. The interface server provides an interface for a network to the application service providing server.

19 Claims, 6 Drawing Sheets

(56) References Cited

U.S. PATENT DOCUMENTS

| | | |
|---|---|---|
| 2002/0042779 A1 | 4/2002 | Osaka et al. |
| 2002/0078344 A1 | 6/2002 | Sandhu et al. |
| 2002/0087894 A1 | 7/2002 | Foley et al. |
| 2002/0091745 A1* | 7/2002 | Ramamurthy et al. ........ 709/100 |
| 2007/0113086 A1* | 5/2007 | Huang et al. .................. 713/168 |
| 2007/0192484 A1 | 8/2007 | Yamaoka et al. |
| 2007/0249342 A1 | 10/2007 | Huang et al. |
| 2008/0098464 A1* | 4/2008 | Mizrah ............................. 726/5 |
| 2008/0250495 A1 | 10/2008 | Hayashi |
| 2009/0183247 A1* | 7/2009 | Kasper et al. ..................... 726/7 |

FOREIGN PATENT DOCUMENTS

| | | |
|---|---|---|
| JP | 11-087016 A | 3/1999 |
| JP | 11-187016 A | 7/1999 |
| KR | 10-2003-0048118 A | 6/2003 |
| KR | 10-2007-0009490 A | 1/2007 |
| KR | 10-2008-0085872 A | 9/2008 |
| RU | 2004130424 A | 7/2005 |
| RU | 2307391 C2 | 9/2007 |
| TW | 200830820 | 7/2008 |

* cited by examiner

METHOD FOR USER TERMINAL AUTHENTICATION OF INTERFACE SERVER AND INTERFACE SERVER AND USER TERMINAL THEREOF

CROSS REFERENCE TO RELATED APPLICATIONS

This application is a National Stage of International Application No. PCT/KR2009/007086 filed on Nov. 30, 2009, which claims priority from Korean Patent Application Nos. 10-2009-0017026, filed on Feb. 27, 2009, KR 10-2009-0025464, filed Mar. 25, 2009 and KR 10-2009-0058167, filed Jun. 29, 2009, the contents of all of which are incorporated herein by reference in their entirety.

TECHNICAL FIELD

The present invention relates to a method for authenticating a user terminal; and more particularly, to a method for authenticating a user terminal in an interface server, and an interface server and a user terminal using the same.

BACKGROUND ART

Due to the development of a communication system, various types of networks have been realized. An environment including multiple types of networks is referred to as a multi-network environment. In the multi-network environment, a user terminal may access one of networks such as a Wireless Local Area Network (WLAN) network, a Code Division Multiple Access (CDMA) network, and a World Interoperability for Microwave Access (WiMAX) network.

Hereinafter, the WiMAX network will be exemplary described as one of the representative communication networks. The WiMAX network provides a communication service that enables a user to access the Internet at a high speed and to receive data or multimedia contents not only in an indoor place but also at the outside and even during travelling using various types of user terminals such as a personal computer, a notebook computer, a personal digital assistant (PDA), a portable multimedia player (PMP), a handset, and a smart phone. Such a WiMAX service enables a user to use the Internet even in the outdoor place such as streets, parks, and vehicles in travelling unlike a high speed internet service that enables a user to use the Internet only at an indoor place with an internet cable is installed such as home, a school, and an office.

A WiMAX forum has been established by communication service providers, communication equipments manufacturers, and semiconductor manufacturers in order to secure comparability among equipment employing a WiMAX technology. The WiMAX forum uses an Institute of Electrical and Electronics Engineers (IEEE) standard 802.16 of a wide band wireless access technology as a fundamental technology. The WiMAX forum has been trying to advance a related technology from a stationary standard 802.16d to a mobile standard 802.16e.

The WiMAX network is a wireless metropolitan area network (WMAN) technology based on IEEE 802.16 standard. In general, the WiMAX network includes an access service network (ASN) and a connectivity service network (CSN). The access service network (ASN) includes a user terminal such as a mobile station (MS) which is a client, a base station (BS), and an access service network gateway (ASN-GW). The connectivity service network (CSN) includes logical entities such as a policy function (PF) entity, an authentication authorization and accounting (AAA) server, and an application function (AF) entity.

Hereinafter, a logical structure of a WiMAX network will be described.

The mobile station (MS) is referred to as a WiMAX terminal that accesses the ASN through a wireless link. An IEEE 802.16D/E standard WMAN access technology is mainly used at a wireless side of a WiMAX network.

The ASN guarantees establishing connection between a WiMAX terminal and a WiMAX base station (BS). The ASN manages wireless resources, finds a network, selects an optimal a network service provider (NSP) for a WiMAX subscriber, operates as a proxy server for controlling authentication authorization and accounting (AAA) of a WiMAX subscriber in a proxy mobile intern protocol (MIP), and accesses an application through a WiMAX terminal.

The CSN allocates an Internet protocol (IP) address for a session of a WiMAX subscriber, provides access for Internet, operates as an AAA proxy or an AAA server, performs a policy and controls access based on the subscribing data of a subscriber, supports establishing a tunnel between the ASN and the CSN, generates an invoice for a WiMAX subscriber, supports a policy of a WiMAX service through an operator, supports forming a loaming tunnel between CSNs, supports mobility between ASNs, provides a location based service, provides an end-to-end service, and supports various WiMAX services such as multimedia broadcast service and a multimedia broadcast multicast service (MBMS).

FIG. 1 is a diagram illustrating a network system according to the related art.

Referring to FIG. 1, the network system according to the related art includes a user terminal 110, a communication system 120, an Internet network 130, and an application service provider 140.

The user terminal 110 is any devices that can access a network including a communication system. For example, the user terminal 110 may be a notebook computer, a personal computer, a personal digital assistant (PDA), a hand set, or a personal multimedia player (PMP).

The communication system 120 includes a base station 121 or a radio access station (RAS) for controlling connection of a physical communication channel, an Access Service Network Gate Way (ASN-GW) 122 or Base Station Controller/Serving GPRS Supporting Node (BSC/SGSN) for controlling Medium Access Control (MAC) of an access network, Connectivity Service Network (CSN) 123 or Packet Data Service Node/Gateway GPRS Support Node (PDSN/GGSN) for controlling connection of a network layer. The communication system 120 may further include a location information server (LIS), a device capability server, a user profile server, a quality of service server (QoS), and a billing server.

The application service provider 140 has servers for providing a predetermined service to the user terminal 110. The application service provider 140 may include an Internet Protocol Television (IPTV) server for providing an Internet based television programs to a user terminal 110 accessing the Internet network 130, a contents server for providing music/video contents in real time, a search engine server for providing a result of a search inquiry in response to a request of the user terminal 110, an advertisement server for providing advertisement, and a service server 139 for providing services.

Hereinafter, an operation of a network system according to the related art will be described. For example, the network system according to the related art performs following operations when a user of a user terminal 110 requests a map service from the application service provider 140.

The user of the user terminal 110 is located at an area A. The user terminal 110 requests a map service to an application service provider 140 through a communication system 120 and an internet network 130. The application service provider 140 provides a web page (or a web site) as the map service to the user terminal 110.

The application service provider 140 provides an initial map image of a predetermined area which is initially selected in a map service server regardless of a current location of a user terminal 110. When the user requests a map image of a certain area after sending the initial map image of the predetermined area, the application service provider 140 provides a map image of a corresponding area to a user.

If the application service provider 140 provides a map image of a current location of a user terminal when the user terminal 110 access a server of the application service provider 140 providing the map service, the application service provider can provide a personalized map service to a user. In this way, the user may be provided with a better service. In order to provide such a personalized service, the application service provider 140 needs personal information. Therefore, there has been a demand for a method of receiving personal information such as location information of the user terminal 110 when the application service provider 140 provides a personalized service to the user terminal 110.

When the application service provider 140 requests the personal information such as location information of the user terminal 110 to the communication system 120 after accessing the communication system 120, it is required to establish an interface and to perform mutual authentication among the application service provider 140, the user terminal 110, and the communication system 120.

DISCLOSURE

Technical Problem

An embodiment of the present invention is directed to providing an interface for enabling an application service provider to use unique information of a predetermined network by accessing a communication system that manages the predetermined network.

An embodiment of the present invention is directed to providing a method for mutual authentication among an application service provider, a user terminal, and a communication system operating a predetermined network.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a user terminal authentication method of an interface server, including: receiving authentication request information from an application service providing server in order to request the interface server to authenticate the user terminal receiving an application service provided from the application service providing server; authenticating the user terminal according to the authenticating request information using an authentication method selected by the interface server or a user of the user terminal; and transmitting authentication response information including an authentication result of performing the authentication method to the application service providing server, wherein the interface server provides an interface for a network to the application service providing server.

In accordance with another aspect of the present invention, there is provided an interface server including: a receiver configured to receive authentication request information from an application service providing server in order to request the interface server to authenticate a user terminal that receives an application service provided from the application service providing server; an authentication controller configured to authenticate the user terminal according to the authentication request information using an authentication method selected by the interface server or a user of the user terminal; and a transmitter configured to transmit authentication response information including an authentication result of performing the authentication method to the application service providing server, wherein the interface server provides an interface for a network to the application service providing server.

In accordance with another aspect of the present invention, there is provided a method for authenticating a user terminal in an interface server including: receiving authentication request information from an application service providing server in order to request the interface server to authenticate the user terminal receiving an application service provided from the application service providing server; transmitting the authentication request information to the interface server; receiving authentication response information including an authentication result of performing an authentication method according to the authentication request information in the interface server and the authentication method is selected by the interface server or a user of the user terminal; and transmitting the received authentication response information to the application service providing server, wherein the interface server is a server providing an interface for a network to the application service providing server.

In accordance with another aspect of the present invention, there is provided a user terminal including: a receiver configured to receive authentication request information from an application service providing server in order to request the interface server to authenticate the user terminal that receives an application service provided from the application service providing server; and a transmitter configured to transmit the authentication request information to the interface server, wherein the receiver receives authentication response information including an authentication result of performing an authentication method according to the authentication request information in the interface server and the authentication method is selected by the interface server or a user of the user terminal, wherein the transmitter transmits the received authentication response information to the application service providing server, and wherein the interface server provides an interface for a network to the application service providing server.

In accordance with another aspect of the present invention, there is provided a computer readable recording medium storing a method for authenticating a user terminal in an interface server, the method includes: receiving authentication request information to request authenticating a user terminal that receives an application service from an application service providing server; authenticating the user terminal according to the authenticating request information using an authentication method selected by the interface server or a user of the user terminal; and transmitting authentication response information including an authentication result of performing the authentication method to the application service providing server, wherein the interface server provides an interface for a network to the application service providing server.

In accordance with another aspect of the present invention, there is provided a computer readable recording medium storing a method for authenticating a user terminal in an interface server, the method includes: receiving authentication request information from an application service providing server to request the interface server to authenticate the user terminal receiving an application service provided from the application service providing server; transmitting the authentication request information to the interface server; receiving authentication response information including an authentication result of performing an authentication method selected by the interface server or a user of the user terminal according to the authentication request information in the interface server; and transmitting the received authentication response information to the application service providing server, wherein the interface server is a server providing an interface for a network to the application service providing server.

Advantageous Effects

An interface server according to the present invention provides an interface that enables an application service provider to use information of a predetermined network. Further, an authentications method according to the present invention performs mutually authentication among an application service provider, a user terminal, and a communication system managing a predetermined network.

BEST MODE FOR THE INVENTION

Figure 1:
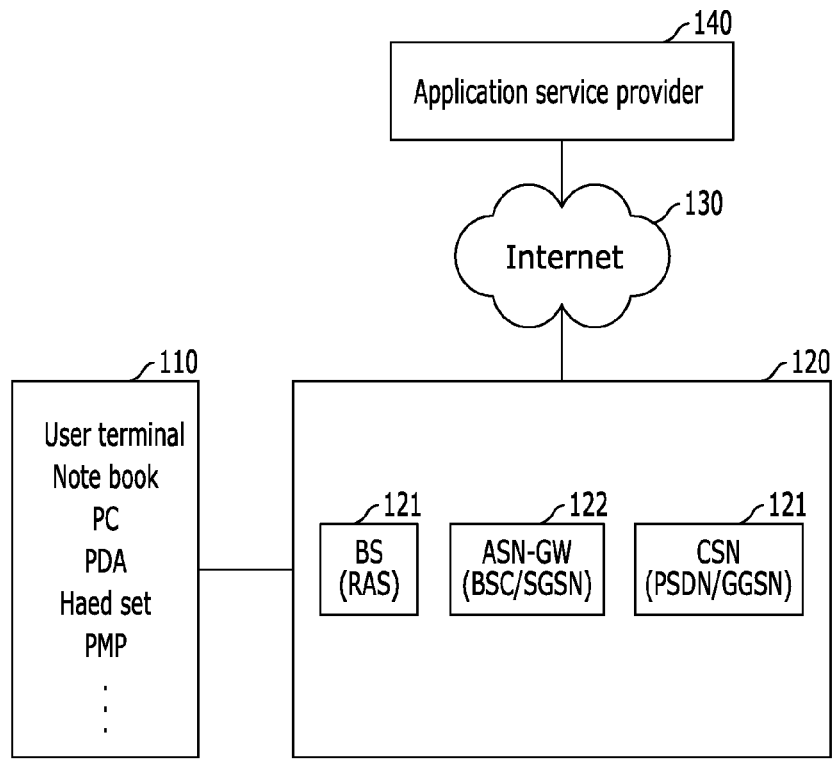
FIG. 1 is a diagram illustrating a network system according to the related art.

Following description exemplifies only the principles of the present invention. Even if they are not described or illustrated clearly in the present specification, one of ordinary skill in the art can embody the principles of the present invention and invent various apparatuses within the concept and scope of the present invention. The use of the conditional terms and embodiments presented in the present specification are intended only to make the concept of the present invention understood, and they are not limited to the embodiments and conditions mentioned in the specification.

Also, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable media, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

In the claims of the present specification, an element expressed as a means for performing a function described in the detailed description is intended to include all methods for performing the function including all formats of software, such as combinations of circuits for performing the intended function, firmware/microcode and the like.

To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

The present invention relates to an interface that enables an application service provider to transmit and receive information by accessing a predetermined network using a communication system managing the predetermined network and a method for mutual authentication among an application service provider, a user terminal, and a communication system managing a predetermined network.

In the present invention, an interface server is included in a communication system managing a predetermined network. The interface server provides an interface for smooth data exchange between an application service provider and a predetermined network. The interface server must protect a network service provider (NSP) from security attack. Therefore, it is necessary to authenticate the network service provider (NSP) and the application service provider. The interface server ensures security and integrity of personal information and non-repudiation for exchanged message.

Hereinafter, a method for authenticating a user terminal in an interface server, an interface server, and a user terminal according to embodiments of the present invention will be described with reference to the accompanying drawings.

Figure 2:
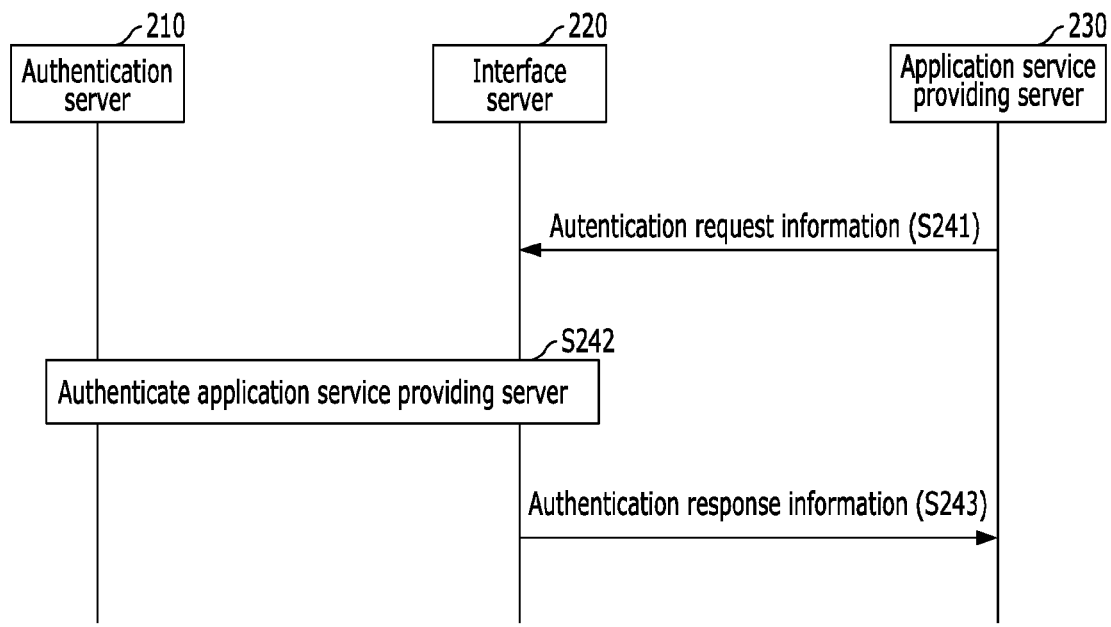
FIG. 2 is a diagram illustrating authentication of an application service provider.

FIG. 2 is a diagram illustrating authentication of an application service provider.

Referring to FIG. 2, an authentication server 210, an interface server 220, and an application service providing server 230 exchange data with each other in order to perform mutual authentication.

The authentication server 210 performs various types of authentication. For example, the authentication server 210 may be an authentication, authorization, and accounting (AAA) server. In FIG. 2, the authentication server 210 is described as performing authentication of the application service providing server 230.

The interface server 220 provides an interface environment for enabling the application service providing server 230 to access a network and to exchange data through the network. The interface server 220 may provide information about capability of the network and information about a user terminal to the application service providing server 230.

The application service providing server 230 provides a predetermined service to the user terminal. For example, the predetermined service may include an internet based service. The application service providing server 230 is realized by an application service provider (ASP). The application service providing server 230 may provide various contents and advertisements.

The application service provider (ASP) includes an Internet application service provider (iASP). The Internet application service provider may provide contents or application programs collected by Public Internet such as Yahoo, Google, or E-bay. The Internet application service provider may have additional relation with a content provider (CP) or an Internet advertiser (IA).

The application service provider is authenticated by a network service provider. In order to authenticate the network service provider, the application service providing server 230 transmits authentication request information to the interface server 220 at step S241. The authentication request information may include an authorization token. The network service provider uses the authorization token to determine which application service provider has a right of authentication request. The authorization token includes a certification with signature of an application service provider.

The interface server 220 authenticates the application service providing server 230 with the authentication server 210 using the authentication request information received from the application service providing server 230 at step S242. The authorization token may be used to perform such an authentication process.

The interface server 220 transmits authentication response information including authentication result to the application service providing server 230 at step S243.

Figure 3:
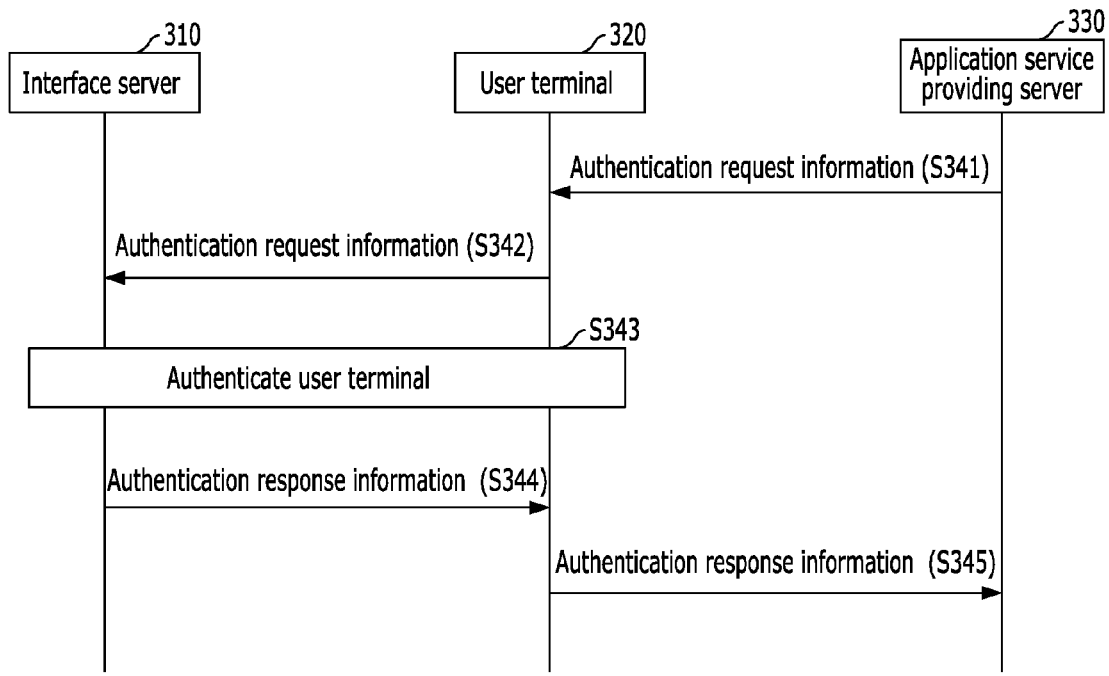
FIG. 3 is a diagram illustrating authentication of a user terminal.

FIG. 3 is a diagram illustrating authentication of a user terminal.

Referring to FIG. 3, an interface server 310, a user terminal 320, and an application service providing server 330 exchange data to each other for authenticating a user terminal.

The interface server 310 provides an interface environment that enables the application service providing server 330 to access a network and to exchange data through the network. The interface server 310 may provide information about network capability and a user terminal to the application service providing server 330.

The user terminal 320 may be any device capable of accessing a network. The user terminal 320 may be a personal computer, a notebook computer, a personal digital assistant (PDA), a portable multimedia player (PMP), a handset, and a smart phone.

The application service providing server 330 provides a predetermined service including an Internet based service. The application service providing server 330 is a server embodied by an application service provider. The application service providing server 230 may provide various contents and advertisements. The application service provider (ASP) includes an Internet application service provider (iASP). The Internet application service provider may provide contents or application programs collected by Public Internet such as Yahoo, Google, or E-bay. The Interne application service provider may have additional relation with a content provider (CP) or an Internet advertiser (IA).

The application service providing server 330 transmits authentication request information to the interface server 310. The authentication request information may pass through the user terminal 320 to the interface server 310. That is, the application service providing server 330 transmits the authentication request information to the user terminal 320 at step S341 and the user terminal 320 transmits the received authentication information to the interface server 310. The user terminal 320 may use a hypertext transfer protocol (HTTP) redirect method to transmit the received authentication request information to the interface server 310.

The authentication information includes information for requesting authentication of the user terminal 320 that receives an application service of the application service providing server 330 to the interface server 310. The application service indicates a service provided by the application service providing server 330. However, the application service is not limited to an application program. The authentication request information includes authentication request information for detecting identity of a user terminal from an application service providing server.

The authentication request information may include information about a desired authentication method of the application service providing server 330. However, an authentication method of the interface server 310 is not limited thereto. Although the authentication request information includes information about the desired authentication method of the application service providing server 330, it may be ignored.

The interface server 310 performs authentication of the user terminal 320 using a predetermined authentication method based on the received authentication request information at step S343. The predetermined authentication method includes an authentication method selected by the interface server 310 or an authentication method selected by the user of the user terminal 320. The authentication method selected by the interface server 310 may be decided based on a policy of a network service provider (NSP) who provides a network. The authentication method set by the user of the user terminal 320 may be selected based on subscription of the user.

The authentication method may be an IP address based authentication method, a certification based authentication method, or a user input based authentication method. Hereinafter, those authentication methods will be described in detail.

At first, the IP address based authentication method controls the interface server 310 to refer an IP address of the user terminal 320 to authenticate the user terminal 320. In this case, an additional authentication server such as an AAA server may be used. The IP address based authentication method is very convenience. However, the IP address based authentication method has a shortcoming of weak security.

The certification based authentication method uses a certification of a user terminal side to authenticate the user terminal. The certification based authentication method has an advantage of high security. However, it is not convenient to use and it is also difficult to embody. The certification may include a certification for a network of a user terminal side.

The user input based authentication method authenticates a user terminal based on information input from a user of the user terminal. The user input information may include an ID of a user or a user terminal and a corresponding password. As an ID for corresponding authentication, one of a permanent ID and a temporary ID is decided according to a policy of a network service provider (NSP). In the user input based authentication method, the authentication request information received from the application service providing server 330 is redirected to an ID/PASSWORD input based authentication apparatus using a Hypertext Transfer Protocol (HTTP) redirect method for ID/PASSWORD input based authentication. Here, the ID/PASSWORD input based apparatus may include a web portal supporting ID/PASSWORD authentication.

After performing the authentication based on the authentication request information, the interface server 310 transmits authentication response information including the authentication result to the application service providing server 330. The authentication response information is transmitted to the application service providing server 330 passing through the user terminal 320. That is, the interface server 310 transmit the authentication response information to the user terminal 320 at step S344 and the user terminal 320 transmits the received authentication response information to the application service providing server 330 at step S345. The user terminal 320 may use a Hypertext transfer protocol (HTTP) redirect method for transmitting the received authentication response information to the service providing server 330.

If the user terminal is successfully authenticated, the authentication response information may include identity information and information about authentication result about a network of a user terminal. If not, the authentication response information may include information about authentication failure.

Hereinafter, information included in the authentication request information will be described based on a SAML message. The SAML stands for a security assertions markup language. The SAML is a standard for an extensible markup language for exchanging business security information on Internet. The SAML is a common language for security service mutual operation between different systems and describing XML information. Lately, security information has been required for various businesses on Internet because Internet business has been expanded such as B2C and B2B and a business starting site becomes different from a business ending site. Accordingly, the SAML is an language providing a single sign-on (SSO) function that enables an open solution having interoperability and comparability with various protocols and easy resource access.

For example, syntax <AuthnRequest> is used as authentication request in the SAML. The authentication request information may include an ASP identifier of an application service providing server, network ID information of a user terminal (User/MS USI ID to authenticate), a permanent ID and a temporary ID indication information (L-ID/S-ID request indication), internal application service provider signature (Signature of iASP). Table 1 shows the information included in the authentication request information in detail.

TABLE 1

| Parameter | SAML element |
|---|---|
| ASP identifier | <Issuer> |
| User/MS USI ID to authenticate | <Subject> |
| L-ID/S-ID request indication | <NameIDPolicy> |
| Signature of iASP | <ds:Signature> |
| Whether authentication can be done based on previous authentication, such as the network entry + IP address | ForceAuthn |

Table 2 shows a permanent ID and a temporary ID in detail.

TABLE 2

| Value | Meaning |
|---|---|
| urn:oasis:names:tc:SAML:2.0:nameid-format:persistent | The USI identity is L-ID |
| urn:oasis:names:tc:SAML:2.0:nameid-format:transient | The USI identity is S-ID |

Meanwhile, the authentication request information may include information by syntax <AuthzDecisionStatement>. Table 3 shows information of the syntax <AuthzDecisionStatement>.

TABLE 3

| Parameter | SAML element |
|---|---|
| Identity of authorizing iASP | <Issuer> |
| Reference to request | <Resource> |
| Signature of iASP | <ds:Signature> |

The authentication response information may include information by syntax <AuthnStatement>. Table 4 shows information of the syntax <AuthnStatement> in detail.

TABLE 4

| Parameter | SAML element | Comments |
|---|---|---|
| Identity of USI System!! | <Issuer> | |
| The USI user's ID | <Subject> | Also contains indication of L-ID/S-ID. (Name Identifier Format Identifiers) |
| Authentication method used | <AuthnContext> | URI values specify the authentication contexts. (e.g. URI specifying EAP-TTLS authentication) Values for <AuthnContext> in <AuthnStatement> |
| Signature of USI System | <ds:Signature> | |

The authentication response information may include information by syntax <AuthzDecisionStatement>. Table 5 shows the information of the syntax <AuthzDecisionStatement> in detail.

TABLE 5

| Parameter | SAML element |
|---|---|
| Identity of authorizing USI | <Issuer> |

TABLE 5-continued

| Parameter | SAML element | |
|---|---|---|
| System Reference to request | <Resource> | Specified if a specific request is authorized |
| Identity of target USI System(s) | <Conditions> | Specified if this is authorization for particular USI System(s) |
| The target USI user(s) or MS(s) ID(s) | <Conditions> | Specified if this is a generic authorization for anyone to submit certain USI requests for these targets |
| ASP identity/authorization for the USI request | <Subject> | |
| Signature of USI System | <ds:Signature> | |

In Table 1 to Table 5, USI denotes a universal service interface. A USI system server may be an interface server.

As described above, the interface server authenticates the user terminal without interacting with the application service provider. Therefore, it is possible to overcome problems caused because the application service provide does not recognize available authentication methods between the user terminal and the interface server.

Conventionally, an interface server uses an authentication method decided by an application service provider. In this case, an interface server system or a user terminal may be not capable of using such an authentication method. It causes unnecessary new authentication procedure or limiting a user to use a service due to authentication failure. Therefore, it is not effective method of using an authentication method decided by the application service provider.

Therefore, the authentication method according to the present embodiment enables an interface server to select an authentication method without intervention of an application service provider or enables a user to select an authentication method. Accordingly, although the interface server system cannot accept an authentication method selected by the application service provider, authentication is not failed. Here, when a user selects an authentication method, information about a user selected authentication method may be shared with the interface server system.

Since the authentication method according to the present embodiment includes a method of authentication based a user ID and password, the authentication method according to the present embodiment is convenient to a user and can be simply embodied while securing proper security.

Hereinafter, embodiments of the present invention will be described in detail with reference to the accompanying drawings.

<A First Exemplary Method of Authentication of a User Terminal in an Interface Server>

Figure 4:
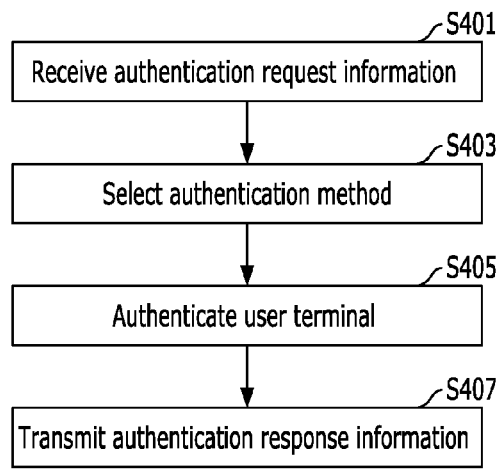
FIG. 4 is a diagram illustrating a method of authenticating a user terminal in an interface server in accordance with an embodiment of the present invention.

FIG. 4 is a diagram illustrating a method for authentication of a user terminal in an interface server in accordance with an embodiment of the present invention.

Referring to FIG. 4, at step S401, authentication request information is received from an application service providing server in order to request the interface server to authenticate a user terminal that receives an application service from the application service providing server. At step S403, an authentication method to authenticate the user terminal is selected according to the received authentication request information. At step S405, an authentication method is selected by the interface server or by a user of the user terminal and the user terminal is authenticated using the selected authentication method. The authentication method may be selected by logical algorithm. At step S405, authentication response information including authentication result is transmitted to the application service providing server.

Here, the interface server is a server providing an interface of a network to the application service providing server.

The authentication request information and the authentication response information may be received or transmitted through the user terminal. In order to transmit the authentication request information and the authentication response information passing through the user terminal, a hypertext transfer protocol (HTTP) redirect method may be used.

The authentication method may be selected by a police of a service provider providing a network or by the selection of a user of the user terminal.

The authentication method may be one of an IP address based authentication method, a certification based authentication method, and a user input based authentication method.

In more detail, the authentication method may include a user terminal ID/PASSWORD input based authentication method. In this case, authentication request information may be redirected to an ID/PASSWORD information input based authentication apparatus using a HTTP redirect method.

If the user terminal is successfully authenticated, the authentication response information may include the authentication result and network identification information of the user terminal.

Here, the network includes a WiMAX network.

The authentication request information may be generated in an application service providing server if the user terminal requests accessing the application service providing server. Here, the user terminal may want access the application service providing server to request a Quality of Service (QoS).

<Interface Server>

Figure 5:
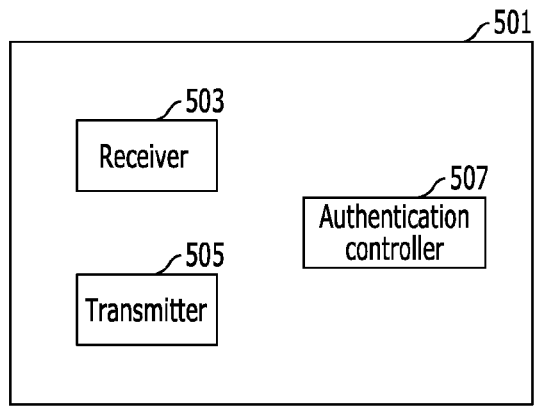
FIG. 5 is a diagram illustrating an interface server performing authentication of a user terminal in accordance with an embodiment of the present invention.

FIG. 5 is a diagram illustrating an interface server performing authentication of a user terminal in accordance with an embodiment of the present invention.

Referring to FIG. 5, the interface server 501 includes a receiver 503, an authentication controller 507, and a transmitter 505. The receiver 503 receives authentication request information from the application service providing server to request authenticating a user terminal receiving an application service provided from the application service providing server. The authentication controller 507 authenticates the user terminal according to the received authentication request information using an authentication method set by the interface server 501 or the user of the user terminal. The transmitter 505 transmits authentication response information including an authentication result to the application service providing server. The interface server 501 is a server providing an interface to the application service providing server for a network.

The authentication request information and the authentication response information may be received or transmitted through the user terminal. In order to transmit the authentication request information and the authentication response information passing through the user terminal, a hypertext transfer protocol (HTTP) redirect method may be used.

The authentication method may be selected according to a police of a service provider providing a network or by the user of the user terminal.

The authentication method may be one of an IP address based authentication method, a certification based authentication method, and a user input based authentication method.

In more detail, the authentication method may include a user terminal ID/PASSWORD based authentication method. In this case, the authentication request information may be redirected to an ID/PASSWORD based authentication apparatus using a HTTP redirect method.

If the user terminal is successfully authenticated, the authentication response information may include the authentication result and network identification information of the user terminal.

Here, the network includes a WiMAX network.

The authentication request information may be generated in an application service providing server if the user terminal requests accessing the application service providing server. Here, the user terminal may want access the application service providing server to request a Quality of Service (QoS).

<A Second Exemplary Method for Authentication of a User Terminal in an Interface Server>

Figure 6:
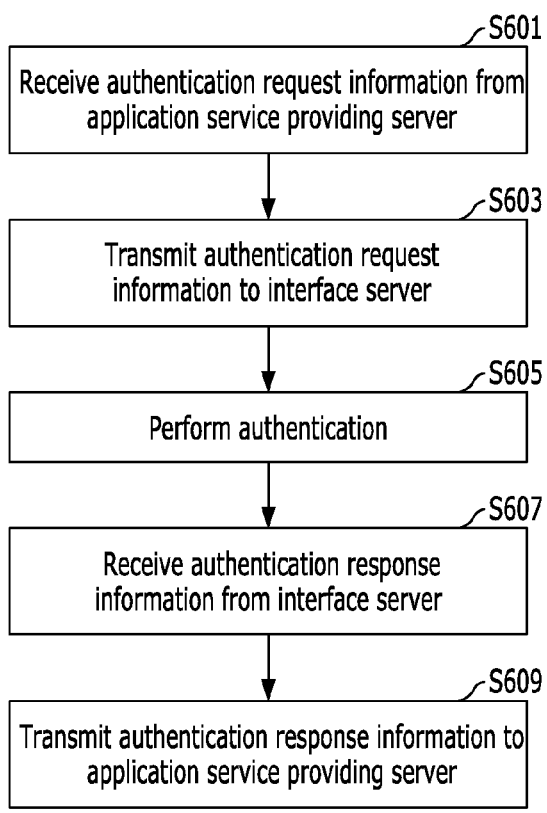
FIG. 6 is a diagram illustrating an authentication procedure performed in a user terminal in a method for authenticating the user terminal in the interface server.

FIG. 6 is a diagram illustrating an authentication process performed in a user terminal in a method for authentication of a user terminal in an interface server according to an embodiment of the present invention.

Referring to FIG. 6, at step S601, a user terminal receives authentication request information from an application service providing server in order to request the interface server to authenticate the user terminal that receives an application service provided from the application service providing server. The user terminal transmits the received authentication request information to the interface server at step S603. The interface server performs an authentication process at step S605. At step S607, the user terminal receives authentication response information which includes an authentication result of performing an authentication method selected by the interface server or the user of the user terminal according to the authentication request information in the interface server. That is, the user terminal receives authentication response information including an authentication result of performing an authentication method according to the authentication request information in the interface server and the authentication method is selected by the interface server or a user of the user terminal. The received authentication response information is transmitted to the application service providing server at step S609. The interface server is a server providing an interface for a network to the application service providing server.

The user terminal uses a HTTP redirect method to transmit the authentication request information to the interface server. Further, the user terminal uses a HTTP redirect method to transmit the authentication response information to the application service providing server.

The authentication method may be selected according to a police of a service provider providing a network or by the user of the user terminal.

The authentication method may be one of an IP address based authentication method, a certification based authentication method, and a user input based authentication method.

In more detail, the authentication method may include a user terminal ID/PASSWORD based authentication method. In this case, the authentication request information may be redirected to an ID/PASSWORD based authentication apparatus using a HTTP redirect method.

If the user terminal is successfully authenticated, the authentication response information may include the authentication result and network identification information of the user terminal.

Here, the network includes a WiMAX network.

The authentication request information may be generated in an application service providing server if the user terminal requests accessing the application service providing server. Here, the user terminal may want access the application service providing server to request a Quality of Service (QoS).

<User Terminal>

Figure 7:
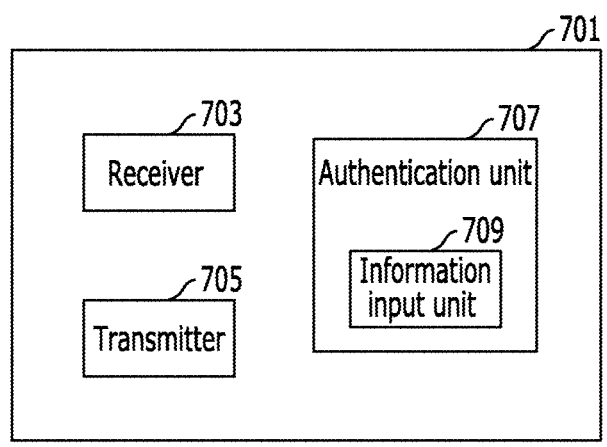
FIG. 7 is a diagram illustrating a user terminal as related in a method for authenticating the user terminal in the interface server in accordance with an embodiment of the present invention.

FIG. 7 is a diagram illustrating a user terminal in authentication of the user terminal in an interface server in accordance with an embodiment of the present invention.

Referring to FIG. 7, the user terminal 701 includes a receiver 703 for receiving authentication request information for requesting the interface server to authenticate the user terminal 701 from the application service providing server and a transmitter 705 for transmitting the authentication request information to the interface server. The receiver 703 receives authentication response information including an authentication result of performing an authentication method selected by the interface server or the user of the user terminal 701 according to the authentication request information from the interface server. That is, the receiver 703 receives authentication response information including an authentication result of performing an authentication method according to the authentication request information in the interface server and the authentication method is selected by the interface server or a user of the user terminal 701.

The transmitter 705 transmits the received authentication response information to the application service providing server. The interface server is a server providing an interface for a network to the application service providing server.

The user terminal 701 uses a Hypertext Transfer Protocol (HTTP) redirect method to transmit authentication request information and to transmit authentication response information to the application service providing server.

The authentication method may be selected according to a police of a service provider providing a network or by the user of the user terminal 701.

The authentication method may be one of an IP address based authentication method, a certification based authentication method, or a user information input based authentication method of the user terminal 701.

The authentication method further includes a method for mutually exchanging information between an interface server and a user terminal 701. In this case, the user terminal 701 further includes an authentication unit 707 for mutually exchanging information. The authentication unit 707 includes an information input unit 709 for receiving ID/PASSWORD information. The authentication method includes an authentication method using information about ID/PASSWORD of the user terminal 701. The receiver 703 receives a request of inputting ID/PASSWORD information from the ID/PASSWORD input based authentication apparatus. The transmitter 705 transmits the input ID/PASSWORD information to the interface server. The ID/PASSWORD information input based authentication apparatus receives the authentication request information from the interface server based on a Hypertext Transfer Protocol (HTTP) redirection method.

If the user terminal 701 is successfully authenticated according to the authentication method, the authentication response information may include identity information and information about authentication result about a network of a user terminal 701.

The network includes a WiMAX network.

When the user terminal 701 requests accessing the application service providing server, the authentication request information may be generated by the application service providing server. Here, the user terminal requests accessing the application service providing server in order to request a Quality of Service (QoS) to the application service providing server.

<Embodiment of the Present Invention>

Figure 8:
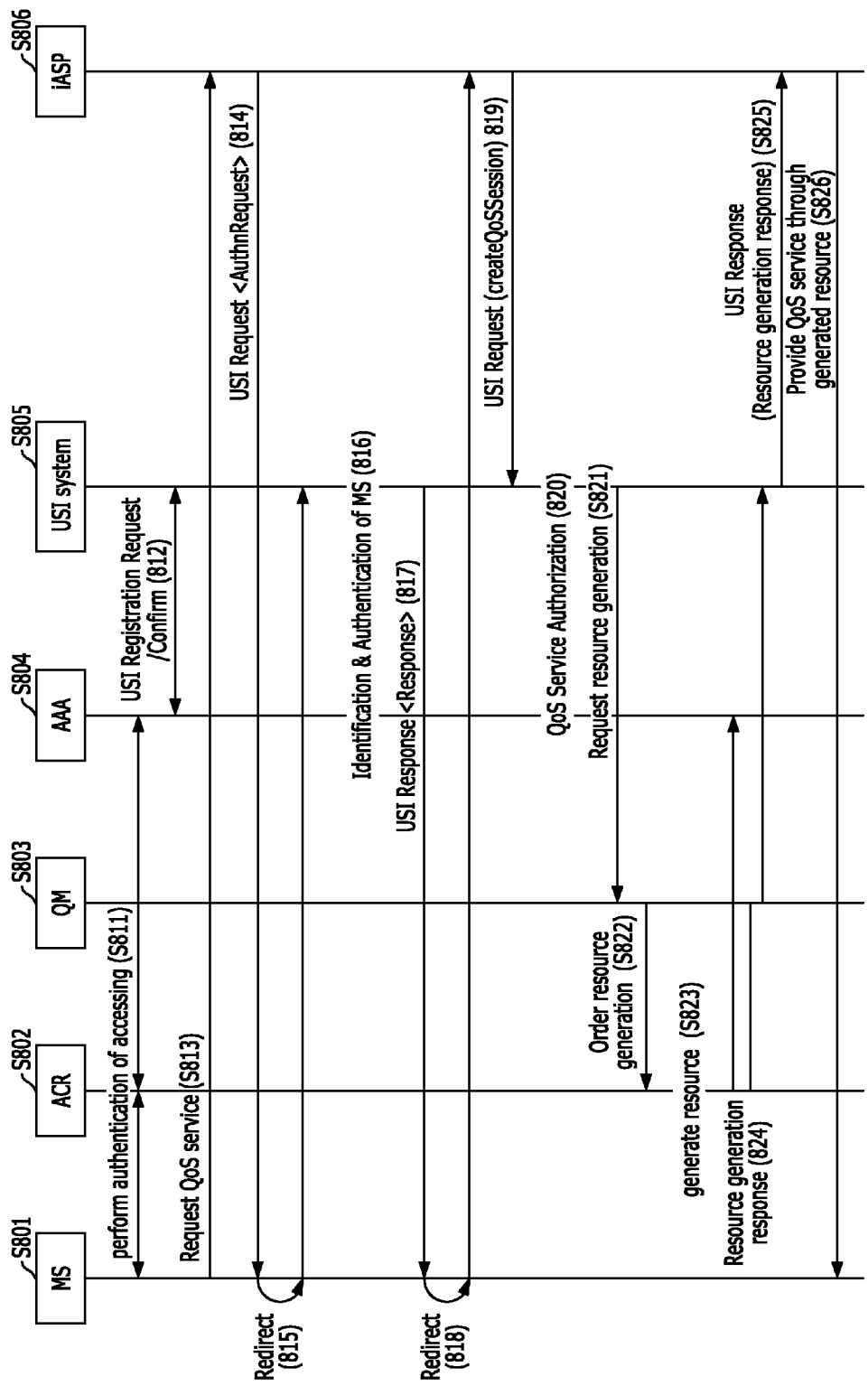
FIG. 8 is a diagram illustrating a service flow of a method for authenticating a user terminal in an interface server in accordance with an embodiment of the present invention.

FIG. 8 is a diagram illustrating a service flow for authenticating a user terminal in an interface server according to an embodiment of the present invention.

Referring to FIG. 8, a mobile station (MS) 801, an access control router (ACR) 802, a quality manager (QM) 803, an AAA server 804, an USI system 805, and an iASP 806 exchange information to each other to authenticate a user terminal. The MS 801 may be a user terminal, and the USI system 805 denotes an interface server. The iASP 806 denotes an application service providing server.

The MS 801 requests accessing a network. Then, the ACR 802 and the AAA server 804 perform authentication of accessing at step S811. The AAA server 804 communicates with the USI system 805 and performs USI Registration Request/Confirm at step S812. The MS 801 requests a QoS service to the iASP 806 at step S813.

The iASP 806 transmits a USI request including authentication request information <AuthnRequest> to the MS at step S814. The MS 801 transmits the received USI Request to the USI system 805 using a redirect method at step S815. The USI system 805 performs authentication and identification of the MS 801 for the received USI Request at step S816. The authentication method may be one of an IP address based authentication method, a certification based authentication method, or a user input based authentication method. Such authentication methods are preformed between the USI system 805 and the MS 801 without intervention of the IAS 806. After authentication, the USI system 805 transmits USI Response including authentication result <Response> to the MS 801 at step S817. The MS 801 transmits the received USI Response to the IASP 806 using the redirect method at step S818.

The iASP 806 transmits the USI Request to the USI system 805 to generate a QoS session at step S819. The USI system 805 generates a QoS service right according to a USI Request for generating the QoS session at step S820 and requests the QM 803 to generate resource at step S821. The QM 803 orders the ACR 802 to generate resource at step S822 and the ACR 802 generates resource at step S823. The ACR 802, the QM 803, the AAA 804, and the USI system 805 response for the resource generation at step S824. The USI system 805 transmits a USI response to the iASP 806 including resource generation response information at step S825. The iASP 806 provides a QoS service through the generated resource to the MS 801 according to the USI Response including the resource generation response information at step S826.

Figure 9:
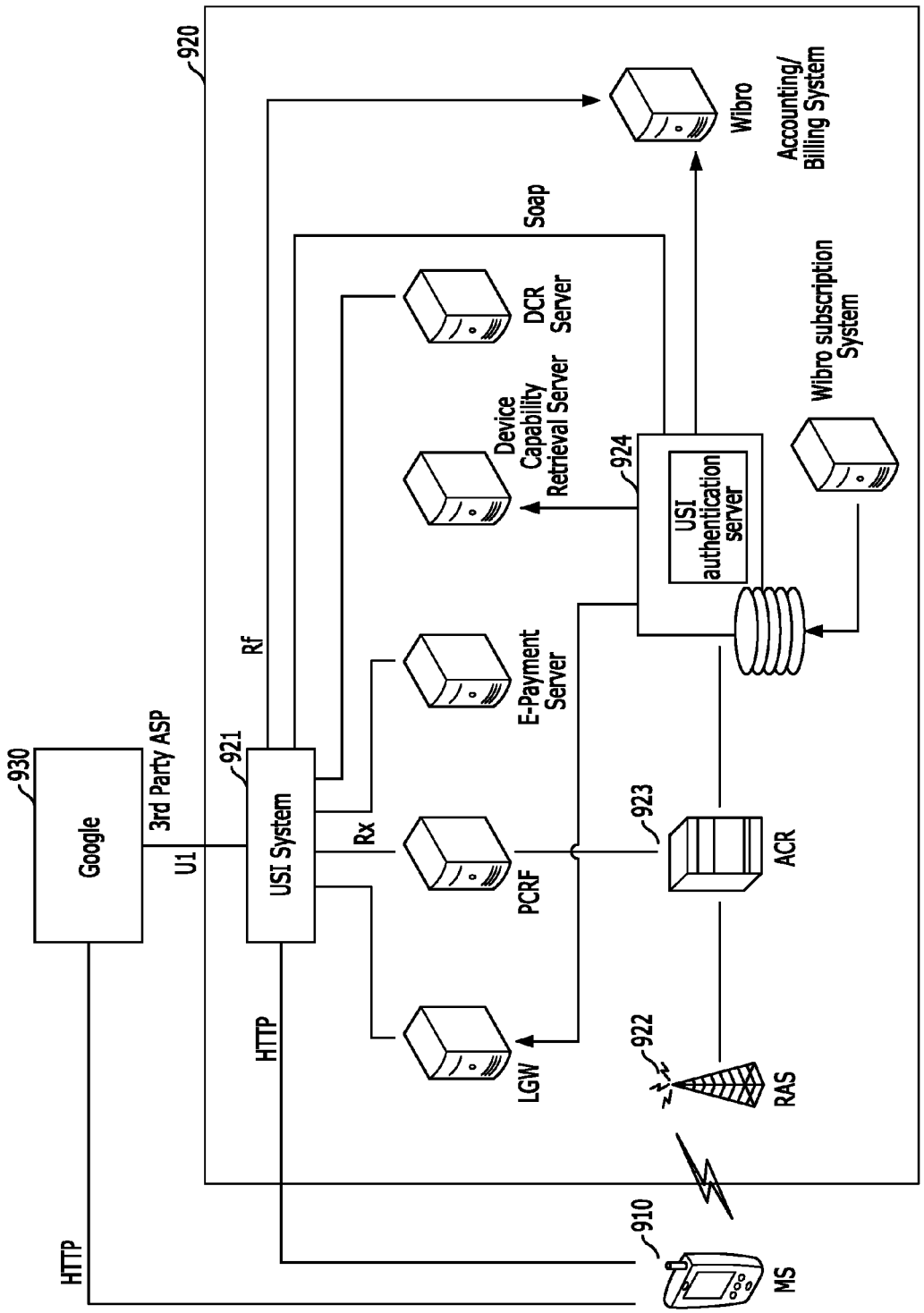
FIG. 9 is a diagram illustrating a system for authenticating a user terminal in an interface server in accordance with an embodiment of the present invention.

FIG. 9 is a diagram illustrating a system for authenticating a user terminal in an interface server in accordance with an embodiment of the present invention.

Referring to FIG. 9, the system includes a MS 901, a network communication system 920, and an application service providing server 930. The application service providing server 830 may be Google as a 3$^{rd}$ party ASP.

The network communication system 920 includes a USI system 921, a RAS 922, an ACR 923, and an USI authentication server 924. The network communication system 920 further includes LGW, PCFR, E-Payment Server, Device Capability Retrieval Server, DCR Server, Wibro (Wimax) Accounting/Billing System, Wibro (Wimax) subscription System.

In order to perform the authentication of a user terminal described in FIG. 2, the application service providing server 930, the USI system 921, and the USI authentication server 924 mutually exchange data to authenticate an application service providing server 930. The USI authentication server 924 may perform a roll of the AAA server.

In order to perform the authentication of a user terminal described in FIG. 3, the MS 910, the USI system 921, and the application service providing server 930 may mutually exchange data to authenticate a user terminal. The MS 910 is connected to the application service providing server 930 using HTTP and exchange data with the application service providing server 930. The USI system 921 authenticates the MS 910 using an authentication method selected by a policy of a service provider or a user of a user terminal without intervention of the application service providing server 930. The authentication method may be one of an IP address based authentication method, a certification based authentication method, and a user input based authentication method.

For example, a user of a MS 910 is located at an area A. The user accesses a Google server 930 which is an application service providing server and searches a bank through the Google server. The Google server 930 transmits information about banks around the area A among the search result of banks. Here, the Google server 930 accesses the USI system 921 and requests the system information or the information of the MS 910 from the USI system 921. Here, the Google server requests location information of the MS 910 to the USI system 921. For this, the USI system 921 authenticates the MS 910. The USI system 921 authenticates the MS 910 without intervention of the Google server 930 in order to prevent security attack or fault ID when the MS 910 is authenticated.

The method of the present invention described above can be realized as a program and stored in a computer-readable recording medium such as CD-ROM, RAM, ROM, floppy disks, hard disks, magneto-optical disks and the like. Since the process can be easily implemented by those skilled in the art to which the present invention pertains, further description will not be provided herein.

For example, a method for authenticating a user terminal in an interface server according to the present invention can be embodied as a computer readable recording medium. The computer readable recording medium storing the method includes: receiving authentication request information to request authenticating a user terminal that receives an application service from an application service providing server; authenticating the user terminal according to the authenticating request information using an authentication method selected by the interface server or a user of the user terminal; and transmitting authentication response information including an authentication result of performing the authentication method to the application service providing server, wherein the interface server provides an interface for a network to the application service providing server. Further, a method for authenticating a user terminal in an interface server according to the present invention can be embodied as a computer readable recording medium. The computer readable recording medium storing the method includes: receiving authentication request information from an application service providing server to request the interface server to authenticate the user terminal receiving an application service provided from the application service providing server; transmitting the authentication request information to the interface server; receiving authentication response information including an authentication result of performing an authentication method selected by the interface server or a user of the user terminal according to the authentication request information in the interface server; and transmitting the received authentication response information to the application service providing server, wherein the interface server is a server providing an interface for a network to the application service providing server.

While the present invention has been described with respect to the specific embodiments, it will be apparent to those skilled in the art that various changes and modifications may be made without departing from the spirit and scope of the invention as defined in the following claims.

Industrial Applicability

A method for authenticating a user terminal in an interface server, and an interface server and a user terminal using the same according to the present invention can be applied to a communication system using a network for authentication procedure.

What is claimed is:

1. A method for authenticating a user terminal in an interface server, comprising:
   receiving authentication request information from an application service providing server in order to request the interface server to authenticate the user terminal receiving an application service provided from the application service providing server;
   authenticating the user terminal according to the authenticating request information using an authentication method selected by the interface server or a user of the user terminal; and
   transmitting authentication response information including an authentication result of performing the authentication method to the application service providing server,
   wherein the interface server provides an interface for a network to the application service providing server, and
   wherein the authentication request information is received by passing through the user terminal, and the authentication response information is transmitted by passing through the user terminal,
   wherein the authentication method is selected by one from among the interface server and the user of the user terminal without intervention of the application service providing server, in order to successfully authenticate the user terminal, when the interface server cannot accept an authentication method selected by the application service providing server, and
   wherein information about the authentication method selected by the user of the user terminal is shared with the interface server.

2. The method of claim 1, wherein a hypertext transfer protocol (HTTP) redirect method is used to transmit and to receive the authentication request information by passing through the user terminal.

3. The method of claim 1, wherein the authentication method is selected by a policy of a service provider providing the network or the selection of the user of the user terminal.

4. The method of claim 1, wherein the authentication method includes one of an IP address based authentication method that authenticates the user terminal based on an IP address, a certification based authentication method that authenticates the user terminal based on a certification, or a user input based authentication method that authenticates the user terminal based on information input from a user of the user terminal.

5. The method of claim 1, wherein the authentication method includes an ID and password input based authentication method that authenticates the user terminal based on at least one from among an ID and PASSWORD input of the user terminal, and the authentication request information is redirected to an apparatus for authenticating the user terminal based on the at least one from among an ID and PASSWORD input using a hypertext transfer protocol (HTTP) redirect method.

6. The method of claim 1, wherein when the user terminal is successfully authenticated, the authentication response information includes identity information and information about authentication result about a network of a user terminal.

7. The method of claim 1, wherein the network is a World Interoperability for Microwave Access (WiMAX) network.

8. The method of claim 1, wherein the authentication request information is generated in the application service providing server when the user terminal requests accessing to the application service providing server.

9. An interface server, comprising:
   a receiver configured to receive authentication request information from an application service providing server in order to request the interface server to authenticate a user terminal that receives an application service provided from the application service providing server;
   an authentication controller configured to authenticate the user terminal according to the authentication request information using an authentication method selected by the interface server or a user of the user terminal; and
   a transmitter configured to transmit authentication response information including an authentication result of performing the authentication method to the application service providing server,
   wherein the interface server provides an interface for a network to the application service providing server,
   wherein the authentication method is selected by one from among the interface server and the user of the user terminal without intervention of the application service providing server, in order to successfully authenticate the user terminal, when the interface server cannot accept an authentication method selected by the application service providing server, and
   wherein information about the authentication method selected by the user of the user terminal is shared with the interface server.

10. A method for authenticating a user terminal in an interface server, comprising:
    receiving authentication request information from an application service providing server in order to request the interface server to authenticate the user terminal receiving an application service provided from the application service providing server;
    transmitting the authentication request information to the interface server;
    receiving authentication response information including an authentication result of performing an authentication method according to the authentication request information in the interface server and the authentication method is selected by the interface server or a user of the user terminal; and
    transmitting the received authentication response information to the application service providing server,
    wherein the interface server is a server providing an interface for a network to the application service providing server,
    wherein the authentication method is selected by one from among the interface server and the user of the user terminal without intervention of the application service providing server, in order to successfully authenticate the user terminal, when the interface server cannot accept an authentication method selected by the application service providing server, and wherein information about the authentication method selected by the user of the user terminal is shared with the interface server.

11. The method of claim 10, wherein the authentication request information is transmitted to the interface server using a hypertext transfer protocol (HTTP) redirect method and the authentication response information is transmitted to the application service providing server using the HTTP redirect method.

12. The method of claim 10, wherein the authentication method is selected by a policy of a service provider providing the network or the selection of a user of the user terminal.

13. The method of claim 10, wherein the authentication method is one of an IP address based authentication method that authenticates the user terminal based on an IP address, a certificate based authentication method that authenticates the user terminal based on a certificate, or a user input based authentication method that authenticates the user terminal based on user information input of the user terminal.

14. The method of claim 10, wherein the authentication method authenticates the user terminal by mutually exchanging information between the interface server and the user terminal.

15. The method of claim 14, wherein the authentication method includes an ID and password input based authentication method that authenticates the user terminal based on an ID and a password of the user terminal,
    wherein in order to authenticate the user terminal based on the ID and the password, the method further comprising:
    receiving a request of inputting ID and password information from an apparatus for authenticating a user terminal based on ID and password information;
    receiving ID and password information; and
    transmitting the received ID and password information to the interface server, and
    wherein the apparatus receives the authentication request information from the interface server using a hypertext transfer protocol (HTTP) redirect method.

16. The method of claim 10, wherein when the user terminal is successfully authenticated according to the authentication method, the authentication response information includes identity information and information about authentication result about a network of a user terminal.

17. The method of claim 10, wherein the network is a WiMAX network.

18. The method of claim 10, wherein the authentication request information is generated by the application service providing server when the user terminal requests accessing to the application service providing server.

19. A user terminal, comprising: processor and memory;
    a receiver configured to receive authentication request information from an application service providing server in order to request the interface server to authenticate the user terminal that receives an application service provided from the application service providing server; and
    a transmitter configured to transmit the authentication request information to the interface server,
    wherein the receiver receives authentication response information including an authentication result of performing an authentication method according to the authentication request information in the interface server and the authentication method is selected by the interface server or a user of the user terminal,
    wherein the transmitter transmits the received authentication response information to the application service providing server,
    wherein the interface server provides an interface for a network to the application service providing server
    wherein the authentication method is selected by one from among the interface server and the user of the user terminal without intervention of the application service providing server, in order to successfully authenticate the user terminal, when the interface server cannot accept an authentication method selected by the application service providing server, and
    wherein information about the authentication method selected by the user of the user terminal is shared with the interface server.

* * * * *